US012579775B2

(12) United States Patent (10) Patent No.: US 12,579,775 B2
Gutierrez Valdes et al. (45) Date of Patent: Mar. 17, 2026

(54) IMAGE PROCESSING USING DATUM IDENTIFICATION AND MACHINE LEARNING ALGORITHMS

(71) Applicant: International Business Machines Corporation, Armonk, NY (US)

(72) Inventors: Rogelio Fernando Gutierrez Valdes, Tlaquepaque Jalisco (MX); Sebastien Gilbert, Granby (CA); Ryan Paske, Oronoco, MN (US); Carlos Eduardo Jimenez Pelayo, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 18/337,510

(22) Filed: Jun. 20, 2023

(65) Prior Publication Data

US 2024/0428550 A1 Dec. 26, 2024

(51) Int. Cl.
*G06V 10/44* (2022.01)
*G06T 7/00* (2017.01)
(Continued)

(52) U.S. Cl.
CPC ............ *G06V 10/44* (2022.01); *G06T 7/0002* (2013.01); *G06T 7/13* (2017.01); *G06V 10/242* (2022.01);
(Continued)

(58) Field of Classification Search
CPC ...... G06V 10/44; G06V 10/242; G06V 20/70; G06V 10/255; G06V 10/454; G06V 10/82;
(Continued)

(56) References Cited

U.S. PATENT DOCUMENTS

| 4,213,664 | A | 7/1980 | Mcclenan |
| 7,742,071 | B2 | 6/2010 | Kennedy |

(Continued)

FOREIGN PATENT DOCUMENTS

| CN | 109255776 A | 1/2019 |
| CN | 114119489 A | 3/2022 |

(Continued)

OTHER PUBLICATIONS

International Searching Authority, "Notification of Transmittal of the International Search Report and the Written Opinion of the International Searching Authority, or Declaration," Patent Cooperation Treaty, Jul. 15, 2024, 13 pages, International Application No. PCT/EP2024/063409.

(Continued)

*Primary Examiner* — Oneal R Mistry
*Assistant Examiner* — Jongbong Nah
(74) *Attorney, Agent, or Firm* — David K. Mattheis

(57) ABSTRACT

A computer-implemented method includes receiving an image of an article of interest to be evaluated relative to one or more features of interest, identifying a reference feature of a known size in the received image, identifying two or more extremities of the reference feature in the received image and a number of pixels between the two or more extremities of the reference feature, calculating a pixel size for the selected image based on the reference feature size and the number of pixels between the two or more extremities of the reference feature, annotating the received image to include one or more tolerance lines for the one or more features of interest, and determining whether the one or more features of interest in the image comply with the one or more tolerance lines. A computer program product and computer system corresponding to the method are also disclosed.

20 Claims, 10 Drawing Sheets

(51) Int. Cl.

| | |
|---|---|
| *G06T 7/13* | (2017.01) |
| *G06V 10/24* | (2022.01) |
| *G06V 20/70* | (2022.01) |

(52) U.S. Cl.
CPC .... *G06V 20/70* (2022.01); *G06T 2207/20081* (2013.01); *G06T 2207/20084* (2013.01); *G06T 2207/20132* (2013.01)

(58) Field of Classification Search
CPC ......... G06V 10/22; G06T 7/0002; G06T 7/13; G06T 2207/20081; G06T 2207/20084; G06T 2207/20132; G06T 7/0004; G06T 7/001

See application file for complete search history.

(56) References Cited

U.S. PATENT DOCUMENTS

| | | | | |
|---|---|---|---|---|
| 9,665,932 | B2 | 5/2017 | Lauffer | |
| 9,805,462 | B2 | 10/2017 | Sezginer | |
| 11,151,714 | B2 * | 10/2021 | Takahashi | G01N 21/88 |
| 2018/0349682 | A1 * | 12/2018 | Wong | G06V 40/172 |
| 2020/0342652 | A1 * | 10/2020 | Rowell | G06V 10/82 |
| 2021/0082105 | A1 * | 3/2021 | Avrahami | G06T 1/20 |
| 2023/0332871 | A1 * | 10/2023 | Taylor | G06T 7/254 |

FOREIGN PATENT DOCUMENTS

| | | | |
|---|---|---|---|
| CN | 217878964 | U | 11/2022 |
| CN | 116030053 | A * | 4/2023 |
| JP | 2013-195174 | A | 9/2013 |
| TW | 737659 | B | 9/2021 |
| WO | 2022250808 | A1 | 12/2022 |
| WO | 2024/260644 | A1 | 12/2024 |

OTHER PUBLICATIONS

Bayliss, Andy, "Computer vision use case: Golden image helps detect product defects", Jan. 23, 2020, 6 pages, <https://blogs.sas.com/content/hiddeninsights/2020/01/23/the-real-meaning-of-computer-vision-and-image-analytics/>.
Miura et al., "Anomaly Detection by Deep Learning Named Sense Learning", Oct. 2018, 4 pages, <https://www.researchgate.net/publication/329017285>.
Ren et al., "State of the Art in Defect Detection Based on Machine Vision", Published online: May 26, 2021, 31 pages, <https://link.springer.com/article/10.1007/s40684-021-00343-6>.
Wu et al., "Machine vision inspection of electrical connectors based on improved Yolo v3", May 2020, 13 pages, <https://ieeexplore.ieee.org/document/9187661>.
Zhao et al., "Vision-based adaptive stereo measurement of pins on multi-type electrical connectors", Abstract Only, © 2019 IOP Publishing Ltd., DOI10.1088/1361-6501/ab198f, 5 pages.

* cited by examiner

START

RECTIFY SELECTED IMAGE — 310

DETECT REFERENCE FEATURE — 320

COMPUTE IMAGE PIXEL SIZE — 330

ADD REFERENCE LINES — 340

CROP REGION(S) OF INTEREST — 350

END

300

400

IMAGE PROCESSING USING DATUM IDENTIFICATION AND MACHINE LEARNING ALGORITHMS

BACKGROUND OF THE INVENTION

The present invention relates generally to the field of image processing, and more particularly to using dynamic datum identification to classify connector images.

Image analysis or imagery analysis is the extraction of meaningful information from images, mainly from digital images by means of digital image processing techniques. Image analysis tasks can be as simple as reading bar coded tags or as sophisticated as identifying individuals based on facial features. Computers are an important tool for the analysis of large amounts of image data, for tasks that require complex computation, or for the extraction of quantitative information; however, the human visual cortex is an excellent image analysis apparatus, especially for extracting higher-level information. For many applications, human analysts still cannot be replaced by computers. For this reason, many important image analysis tools such as edge detectors and neural networks are inspired by human visual perception models. Human visual perception models may even be applied in instances where the image features being analyzed are too small to be visible by the human eye.

Current methods for image analysis in fields such as connector inspection exhibit a number of drawbacks and inefficiencies. First, the tolerances as inspected by the present application are not visible to the human eye naturally, and therefore those methods which require manual inspection are inadequate. Existing solutions which leverage a golden image comparison are not feasible because there are situations where entire rows may be shifted; in such cases, when analyzing such rows visually, the entire row of pins could be out of place but wouldn't be identified as long as the row appears straight. Existing solutions which leverage coordinate measuring machines are very slow, and are not optimized to a production environment accordingly. Existing solutions which leverage computer vision systems cannot adjust to the depth of a connector well enough to measure after the housing is put on; inability to analyze the connectors after this point could expose potential for pins to be bent during final assembly and not caught.

SUMMARY

Embodiments of the present invention disclose a computer-implemented method, a computer program product, and a system for image analysis. The image analysis method may include receiving an image of an article of interest to be evaluated relative to one or more features of interest. The method may further include identifying a reference feature in the received image, where the reference feature is a feature of a known size. The method may further include identifying two or more extremities of the reference feature in the received image and a number of pixels between the two or more extremities of the reference feature. The method may further include calculating a pixel size for the selected image based on the reference feature size and the number of pixels between the two or more extremities of the reference feature. The method may further include annotating the received image to include one or more tolerance lines for the one or more features of interest. The method may further include determining whether the one or more features of interest in the image comply with the one or more tolerance lines.

DETAILED DESCRIPTION

Figure 1:
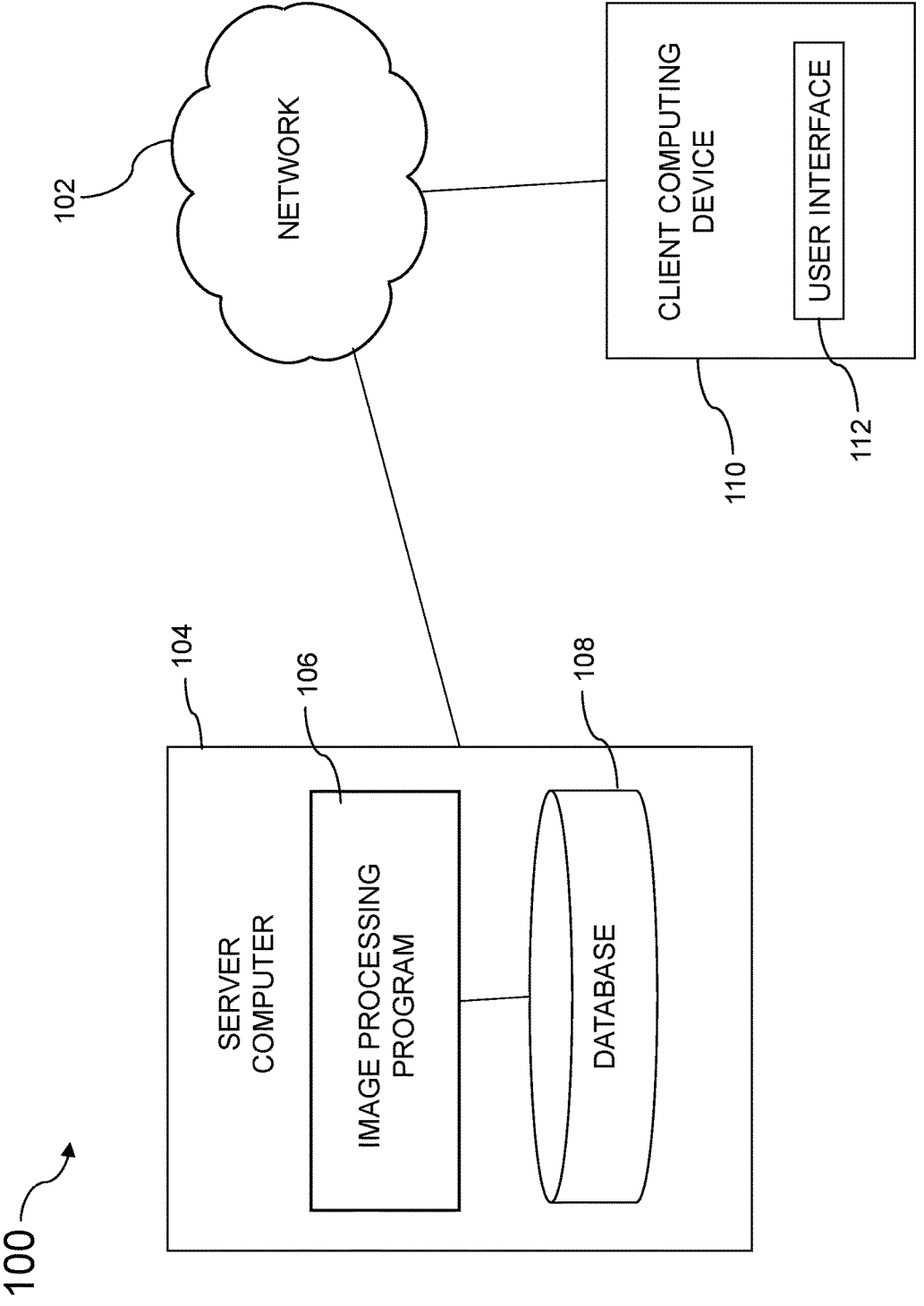
FIG. 1 is a functional block diagram illustrating a distributed data processing environment, in accordance with an embodiment of the present invention.

In some applications, electrical connectors are required to have tight tolerances and specifications. If the specifications are not met, there is risk of damage (electrical or mechanical) to a cable itself or a component that the cable is connected to. There can also be a risk of long-term reliability issues due to the fact that the mated pins lack enough force to produce a reliable electrical connection, especially over time as the pins relax and environmental factors produce effects on the pins such as corrosion. The ability to effectively analyze images of these very small connector specifications is critical to preventing failures of this nature.

Embodiments of the present invention recognize that improvements may be made to image processing techniques to provide a method to inspect and classify the features of a connector and determine if said features meet a set of specifications using a combination of image analysis and deep learning algorithms. Embodiments of the present invention provide a methodology to quickly inspect a connector to keep up with volume production, determine a datum in which to locate the position of the pin on a connector-by-connector basis, accurately detect a variety of defects, and process an image that is recessed in a very small but deep cavity. Implementation of embodiments of the invention may take a variety of forms, and exemplary implementation details are discussed subsequently with reference to the Figures.

According to an aspect of the invention, there is provided a computer-implemented image analysis method. The method includes receiving an image of an article of interest to be evaluated relative to one or more features of interest. The method further includes identifying a reference feature in the received image, where the reference feature is a feature of a known size. The method further includes identifying two or more extremities of the reference feature in the received image and a number of pixels between the two or more extremities of the reference feature. The method further includes calculating a pixel size for the selected image based on the reference feature size and the number of pixels between the two or more extremities of the reference feature. The method further includes annotating the received image to include one or more tolerance lines for the one or more features of interest. The method further includes determining whether the one or more features of interest in the image comply with the one or more tolerance lines. The image analysis method provides increased defect detection efficiency relative to current techniques.

In embodiments, the computer-implemented image analysis method further includes computing a main axis of a predetermined reference feature of the article of interest.

In embodiments, the computer-implemented image analysis method further includes rotating the image by an angle to align the main axis of the predetermined reference feature with any coordinate axis.

In embodiments, the computer-implemented image analysis method further includes computing a running median over a vertical window of a predetermined dimension scanned along the length of the reference feature using the known size of the reference feature and respective coordinates of extremities of the predetermined reference feature.

In embodiments, the computer-implemented image analysis method further includes dividing the known size of the reference feature by a pixel distance between the extremities of the reference feature.

In embodiments, the computer-implemented image analysis method further includes converting a distance from the reference feature to the one or more tolerance lines from millimeters to pixels to calculate upper and lower tolerance regions.

In embodiments, the computer-implemented image analysis method further includes cropping the image to include only areas occupied by the one or more features of interest.

In embodiments, the computer-implemented image analysis method further includes creating an image defect dataset by selecting a group of images with a representative sample of defects including edges of reference features which cross a tolerance line.

In embodiments, the computer-implemented image analysis method further includes annotating the selected group of images by labeling one or more defects in each image of the selected group of images.

In embodiments, the computer-implemented image analysis method further includes augmenting the image defect dataset by generating additional images from the group of images by altering the selected group of images, and adding the generated additional images to the image defect dataset.

In embodiments, the computer-implemented image analysis method further includes training a convolutional neural network model using the augmented dataset. In embodiments, the computer-implemented image analysis method further includes determining the convolutional neural network model's performance level using a sample of images from the augmented dataset.

In embodiments, the computer-implemented image analysis method further includes deploying the convolutional neural network model responsive to determining that the convolutional neural network model's performance meets a selected satisfactory threshold.

According to an aspect of the invention, there is provided an image analysis method computer program product. The computer program product includes instructions for receiving an image of an article of interest to be evaluated relative to one or more features of interest. The computer program product further includes instructions for identifying a reference feature in the received image, where the reference feature is a feature of a known size. The computer program product further includes instructions for identifying two or more extremities of the reference feature in the received image and a number of pixels between the two or more extremities of the reference feature. The computer program product further includes instructions for calculating a pixel size for the selected image based on the reference feature size and the number of pixels between the two or more extremities of the reference feature. The computer program product further includes instructions for annotating the received image to include one or more tolerance lines for the one or more features of interest. The computer program product further includes instructions for determining whether the one or more features of interest in the image comply with the one or more tolerance lines.

In embodiments, the image analysis computer program product includes instructions for computing a main axis of a predetermined reference feature of the article of interest.

In embodiments, the image analysis computer program product includes instructions for rotating the image by an angle to align the main axis of the predetermined reference feature with any coordinate axis.

In embodiments, the image analysis computer program product includes instructions for computing a running median over a vertical window of a predetermined dimension scanned along the length of the reference feature using the known size of the reference feature and respective coordinates of extremities of the predetermined reference feature.

In embodiments, the image analysis computer program product includes instructions for dividing the known size of the reference feature by a pixel distance between the extremities of the reference feature.

In embodiments, the image analysis computer program product includes instructions for converting a distance from the reference feature to the one or more tolerance lines from millimeters to pixels to calculate upper and lower tolerance regions.

In embodiments, the image analysis computer program product includes instructions for cropping the image to include only areas occupied by the one or more features of interest.

In embodiments, the image analysis computer program product includes instructions for creating an image defect dataset by selecting a group of images with a representative sample of defects including edges of reference features which cross a tolerance line.

In embodiments, the image analysis computer program product includes instructions for annotating the selected group of images by labeling one or more defects in each image of the selected group of images.

In embodiments, the image analysis computer program product includes instructions for augmenting the image defect dataset by generating additional images from the group of images by altering the selected group of images, and adding the generated additional images to the image defect dataset.

In embodiments, the image analysis computer program product includes instructions for training a convolutional neural network model using the augmented dataset. In embodiments, the image analysis computer program product includes instructions for determining the convolutional neural network model's performance level using a sample of images from the augmented dataset.

In embodiments, the image analysis computer program product includes instructions for deploying the convolutional neural network model responsive to determining that the convolutional neural network model's performance meets a selected satisfactory threshold.

According to an aspect of the invention, there is provided an image analysis computer system. The computer system includes instructions for receiving an image of an article of interest to be evaluated relative to one or more features of interest. The computer system further includes instructions for identifying a reference feature in the received image, where the reference feature is a feature of a known size. The computer system further includes instructions for identifying two or more extremities of the reference feature in the received image and a number of pixels between the two or more extremities of the reference feature. The computer system further includes instructions for calculating a pixel size for the selected image based on the reference feature size and the number of pixels between the two or more extremities of the reference feature. The computer system further includes instructions for annotating the received image to include one or more tolerance lines for the one or more features of interest. The computer system further includes instructions for determining whether the one or more features of interest in the image comply with the one or more tolerance lines.

In embodiments, the image analysis computer system includes instructions for computing a main axis of a predetermined reference feature of the article of interest.

In embodiments, the image analysis computer system includes instructions for rotating the image by an angle to align the main axis of the predetermined reference feature with any coordinate axis.

In embodiments, the image analysis computer system includes instructions for computing a running median over a vertical window of a predetermined dimension scanned along the length of the reference feature using the known size of the reference feature and respective coordinates of extremities of the predetermined reference feature.

In embodiments, the image analysis computer system includes instructions for dividing the known size of the reference feature by a pixel distance between the extremities of the reference feature.

In embodiments, the image analysis computer system includes instructions for converting a distance from the reference feature to the one or more tolerance lines from millimeters to pixels to calculate upper and lower tolerance regions.

In embodiments, the image analysis computer system includes instructions for cropping the image to include only areas occupied by the one or more features of interest.

In embodiments, the image analysis computer system includes instructions for creating an image defect dataset by selecting a group of images with a representative sample of defects including edges of reference features which cross a tolerance line.

In embodiments, the image analysis computer system includes instructions for annotating the selected group of images by labeling one or more defects in each image of the selected group of images.

In embodiments, the image analysis computer system includes instructions for augmenting the image defect dataset by generating additional images from the group of images by altering the selected group of images, and adding the generated additional images to the image defect dataset.

In embodiments, the image analysis computer system includes instructions for training a convolutional neural network model using the augmented dataset. In embodiments, the image analysis computer system includes instructions for determining the convolutional neural network model's performance level using a sample of images from the augmented dataset.

In embodiments, the image analysis computer system includes instructions for deploying the convolutional neural network model responsive to determining that the convolutional neural network model's performance meets a selected satisfactory threshold.

It should be appreciated that, while many embodiments described herein are described in detail with respect to connector specification adherence, the details of these implementations are specific to connector technology such that the embodiments are described with consistent terminology from start to finish; the image analysis methodologies as described herein can be applied to any set of images with identifiable reference feature(s) and defects.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and client computing device 110 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 110, and other computing devices (not shown) within distributed data processing environment 100. Distributed data processing environment 100 may be implemented in computing environment 600 shown in FIG. 6.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, an edge device, a containerized workload, or any programmable electronic device capable of communicating with client computing device 110 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes image processing program 106 and database 108. Server computer 104 may include internal and external hardware components, as depicted and described in further detail with respect to computer 601 of FIG. 6.

Image processing program 106 may be configured to process images and identify defects in said images. In at least some embodiments, image processing program 106 is configured to send and/or receive images and image data to/from database 108. Image processing program 106 may be configured to send/receive images and image data to/from client computing device 110 via network 102. In at least some embodiments, image processing program 106 may be configured to execute an image inspection method to inspect and evaluate the features of one or more selected images. An appropriate image inspection method 200 is described in detail with respect to FIG. 2. In at least some embodiments, image processing program 106 may be configured to execute an image processing method to process one or more selected images. An appropriate image processing method 300 is described in detail with respect to FIG. 3. In at least some embodiments, image processing program 106 may be configured to execute a convolutional neural network (CNN) deployment method to deploy a CNN model configured to analyze image defects. An appropriate convolutional neural network (CNN) deployment method 500 is described with respect to FIG. 5.

In the depicted embodiment, database 108 resides on server computer 104. In another embodiment, database 108 may reside elsewhere within distributed data processing environment 100, provided that image processing program 106 has access to database 108, via network 102. A database is an organized collection of data. Database 108 can be implemented with any type of storage device capable of storing data and configuration files that can be accessed and utilized by image processing program 106 such as a database server, a hard disk drive, or a flash memory. Database 108 stores information used by and generated by image processing program 106.

The present invention may contain various accessible data sources, such as database 108, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Image processing program 106 enables the authorized and secure processing of personal data. Image processing program 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Image processing program 106 provides information regarding personal data and the nature (e.g., type, scope, purpose, duration, etc.) of the processing. Image processing program 106 provides the user with copies of stored personal data. Image processing program 106 allows the correction or completion of incorrect or incomplete personal data. Image processing program 106 allows the immediate deletion of personal data.

Client computing device 110 can be one or more of a laptop computer, a tablet computer, a smart phone, smart watch, a smart speaker, or any programmable electronic device capable of communicating with various components and devices within distributed data processing environment 100, via network 102. Client computing device 110 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In an embodiment, the wearable computer may be in the form of a smart watch. In one embodiment, the wearable computer may be in the form of a head mounted display (HMD). The HMD may take the form-factor of a pair of glasses, such as augmented reality (AR) glasses, which is a device for viewing mixed reality and/or augmented reality scenarios. In the embodiment where the HMD is a pair of AR glasses, the AR glasses can capture eye gaze information from a gaze point tracker, such as a camera associated with client computing device 110. In general, client computing device 110 represents one or more programmable electronic devices or combination of programmable electronic devices capable of executing machine readable program instructions and communicating with other computing devices (not shown) within distributed data processing environment 100 via a network, such as network 102. Client computing device 110 may be any device capable of capturing and providing an image to image processing program 106. Client computing device 110 includes an instance of user interface 112.

User interface 112 provides an interface between image processing program 106 on server computer 104 and a user of client computing device 110. In one embodiment, user interface 112 is mobile application software. Mobile application software, or an "app," is a computer program designed to run on smart phones, tablet computers and other mobile devices. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In an embodiment, user interface 112 enables a user of client computing device 110 to input data to be used by image processing program 106, such as one or more captured images to be processed by image processing program 106.

Figure 2:
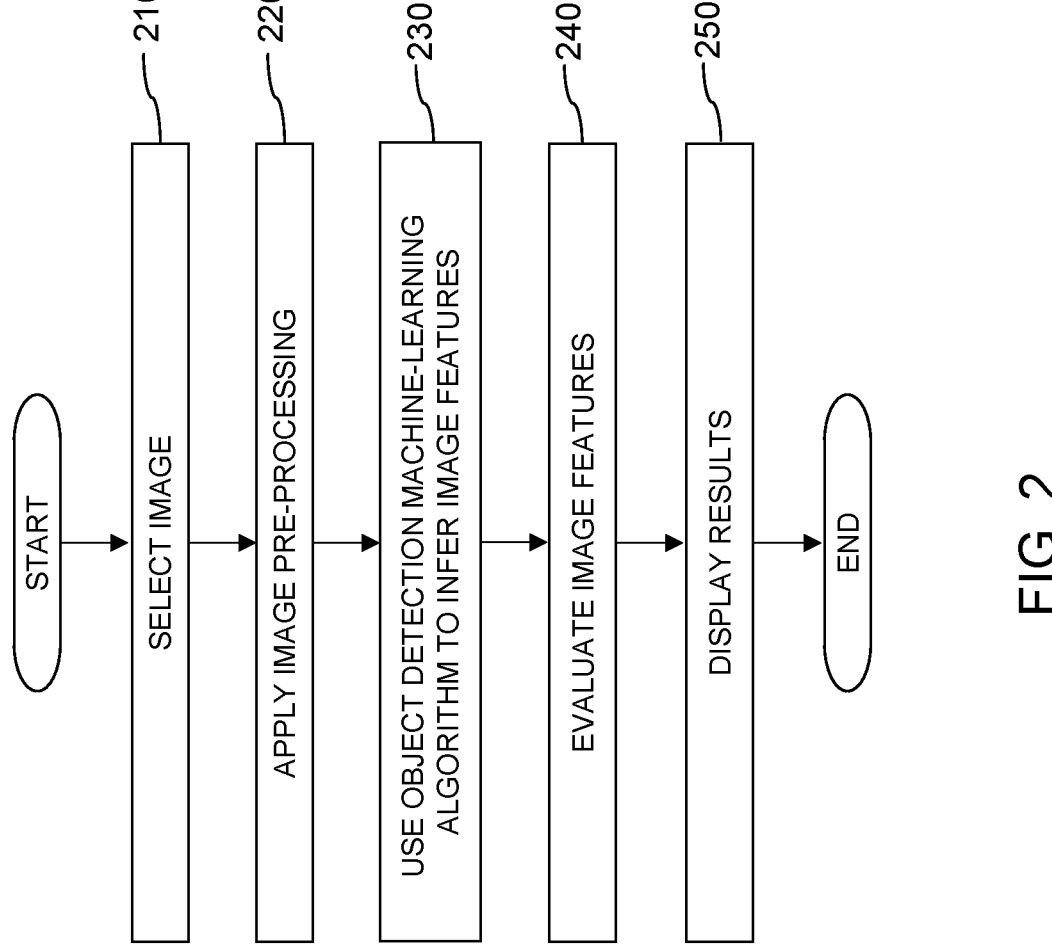
FIG. 2 is a flowchart depicting one embodiment of a connector inspection method in accordance with at least one embodiment of the present invention.
Figure 2:

FIG. 2 is a flowchart depicting one embodiment of an image inspection method 200 in accordance with at least one embodiment of the present invention. As depicted, image inspection method 200 includes capturing (210) an image of a connector, applying (220) image processing, inferring (230) image features, evaluating (240) image features, and displaying (250) results of the connector inspection. Image inspection method 200 may enable increases in efficiency when analyzing images with features with very small tolerance sizes.

Selecting (210) an image of a connector may include identifying an image depicting a connector of interest. In at least some embodiments, selecting (210) an image of a connector includes leveraging available image capturing methods and technologies to create or capture an image of a connector. In general, selecting (210) an image of a connector includes any methodology for identifying an image of interest as a subject for the subsequent steps of connector inspection method 200.

Applying (220) image processing to provide feature tolerance lines may include applying any number of appropriate image processing mechanisms to manipulate or analyze image features. In at least some embodiments, applying (220) image processing may include, but is not limited to, cropping the image, rotating the image, and/or increasing the magnification of the image. Applying (220) image processing may additionally include executing an image processing method; an example appropriate image processing method is described with respect to FIG. 3.

Inferring (230) image features may include using an object detection machine learning algorithm to identify one or more image features for evaluation. In at least some embodiments, inferring (230) image features may include identifying one or more image features of interest to be evaluated with respect to selected tolerances corresponding to said features. Inferring (230) image features includes identifying one or more image features for inspection relative to pertinent connector specifications.

Evaluating (240) image features may include comparing the inferred image features to corresponding feature tolerance lines as annotated during image processing. Evaluating (240) image features may include determining whether an image feature is below a tolerance line as required by the connector specification; similarly, evaluating (240) image features may include determining whether an image feature is above a tolerance line as required by the connector specification. In at least some embodiments, evaluating (240) image features includes determining whether an image feature is between two tolerance lines as required by the connector specification. In general, evaluating (240) image features includes determining whether said image features are positioned appropriately relative to any corresponding tolerance lines based on any compliance indications of the connector specification.

Displaying (250) results of the connector inspection may include displaying compliance results with respect to the inspected connectors and the corresponding tolerance lines. In at least some embodiments, displaying (250) results of the connector inspection includes displaying, for each inspected connector, an indicator of whether or not said connector complies with the corresponding defined tolerances. Displaying (250) results of the connector inspection may include displaying a report including only those connectors which fail to comply with the corresponding defined tolerances. In at least some embodiments, displaying (250) results of the connector inspection includes displaying the pertinent image section corresponding to an inspected connector, such that the connector's adherence to the defined tolerance(s) is shown via the image. In some embodiments, displaying (250) results of the connector inspection may include providing images of the connector with the annotated tolerance lines to a user; such an image may additionally be accompanied by an indicator of whether or not the connector is in compliance with the defined tolerance.

Figure 3:
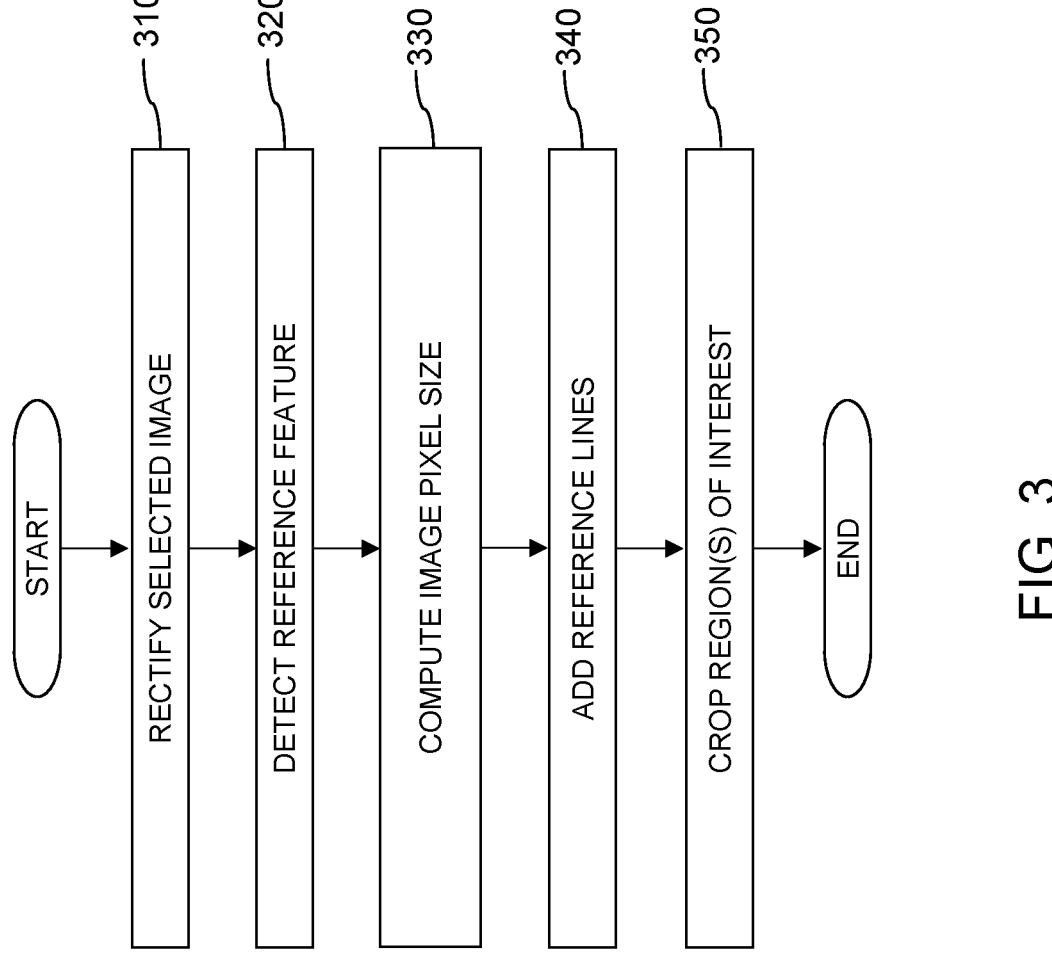
FIG. 3 is a flowchart depicting one embodiment of an image processing method in accordance with at least one embodiment of the present invention.
Figure 3:

FIG. 3 is a flowchart depicting one embodiment of an image processing method 300 in accordance with at least one embodiment of the present invention. As depicted, image processing method 300 includes rectifying (310) a selected image, detecting (320) the image's datum, computing (330) the image's pixel size, adding (340) reference lines to the image, and cropping (350) one or more regions of interest. Image processing method 300 may enable increases in efficiency when analyzing images with features with very small tolerance sizes.

Rectifying (310) a selected image may include computing a main axis of a reference feature. The main axis of reference may refer simply to a central location from which items can be measured or referred to, and may additionally be called the image's datum. For example, with respect to image 402 of M-plug 410 as depicted with respect to FIG. 4B, the main axis of reference 414 is depicted as a dashed line bisecting the two C-shaped forks 412A, 412B at either end of the central rib 416. In general, rectifying (310) a selected image includes identifying any axis from which measuring other points may be convenient. In at least some embodiments, rectifying (310) a selected image includes rotating the selected by an angle such that the reference feature is aligned with the x-axis. Referring again to the image 402 of the M-plug 410 as depicted with respect to FIG. 4B, the main axis of reference 414 is already aligned with the x-axis, so no rotation is required; in an embodiment where the image of an M-plug may be slightly skewed for example, the image may be rotated until the line bisecting the two C-shaped forks is parallel to the x-axis. In at least some embodiments, the In general, rectifying (310) a selected image includes projecting the image onto a common image plane.

Figure 4A:
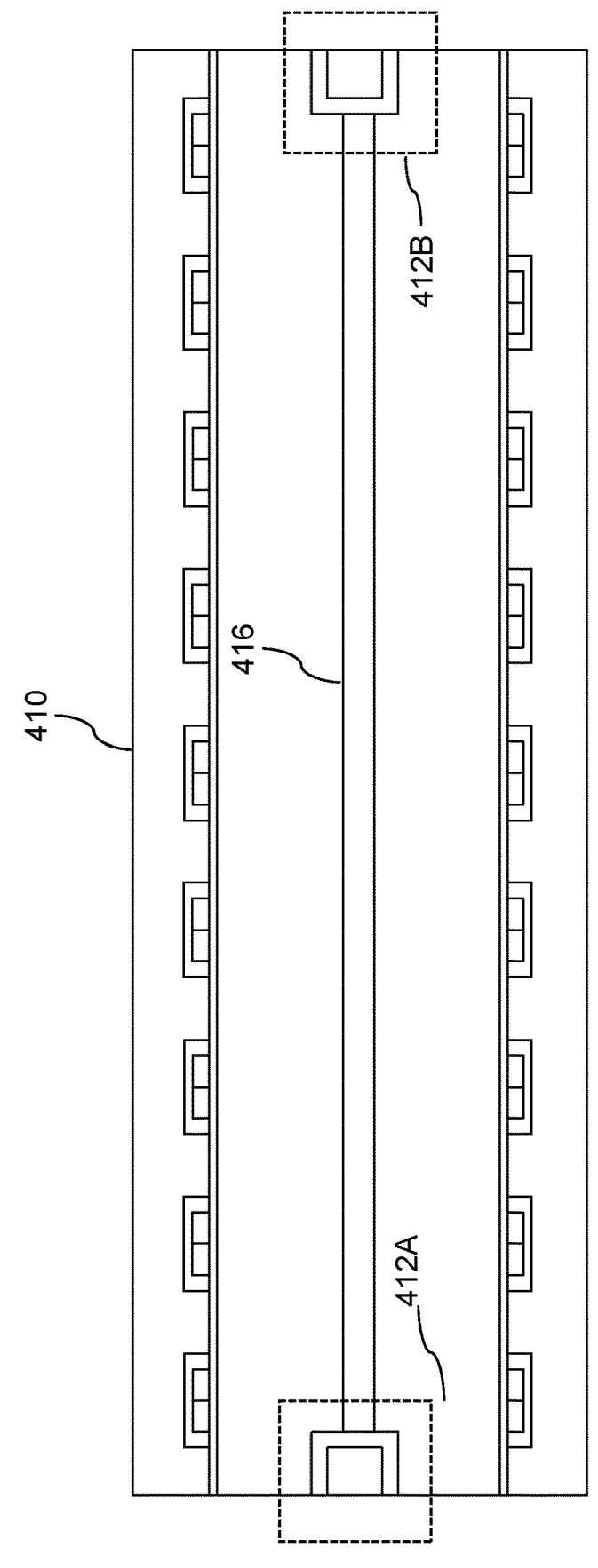
FIG. 4A is an image depicting an M-connector in accordance with at least one embodiment of the present invention.

Identifying (320) a reference feature in the image may include identifying an image feature whose dimension is known. In at least some embodiments, identifying such an image feature includes locating said feature and identifying its extremities. For example, with respect to image 400 of M-plug 410 as depicted with respect to FIG. 4A, the reference feature is central rib 416 connecting the two C-shaped forks 412A and 412B. Detecting (320) the image's reference feature may further include identifying an edge and transition from surface to surface to establish the reference feature's location, such that sharp transitions in image features may indicate the edges of the datum. For example, consider FIG. 4C, which is a graph depicting median gray levels corresponding to an image of an M-plug. The sharp transitions as identified may indicate the edges of the image's reference feature. Detecting (320) the image's reference feature may additionally include using semantic segmentation and region identification to establish the reference feature location. In general, detecting (320) the image's reference feature includes determining the location (s) of one or more features of known size within the image.

Computing (330) the image's pixel size may include determining how many image pixels the reference feature contains, and calculating the size of each pixel accordingly. In at least some embodiments, computing (330) the image's pixel size includes computing a running median over a narrow vertical window scanned along the length of the reference feature. The sharp transitions in the calculated window indicate the x-coordinates of the reference feature extremities. Once the extremities of the reference feature are identified, the pixel size can be computed by dividing the reference feature dimension (in millimeters, for example) by the distance in between the extremities (in pixels).

Figure 4B:
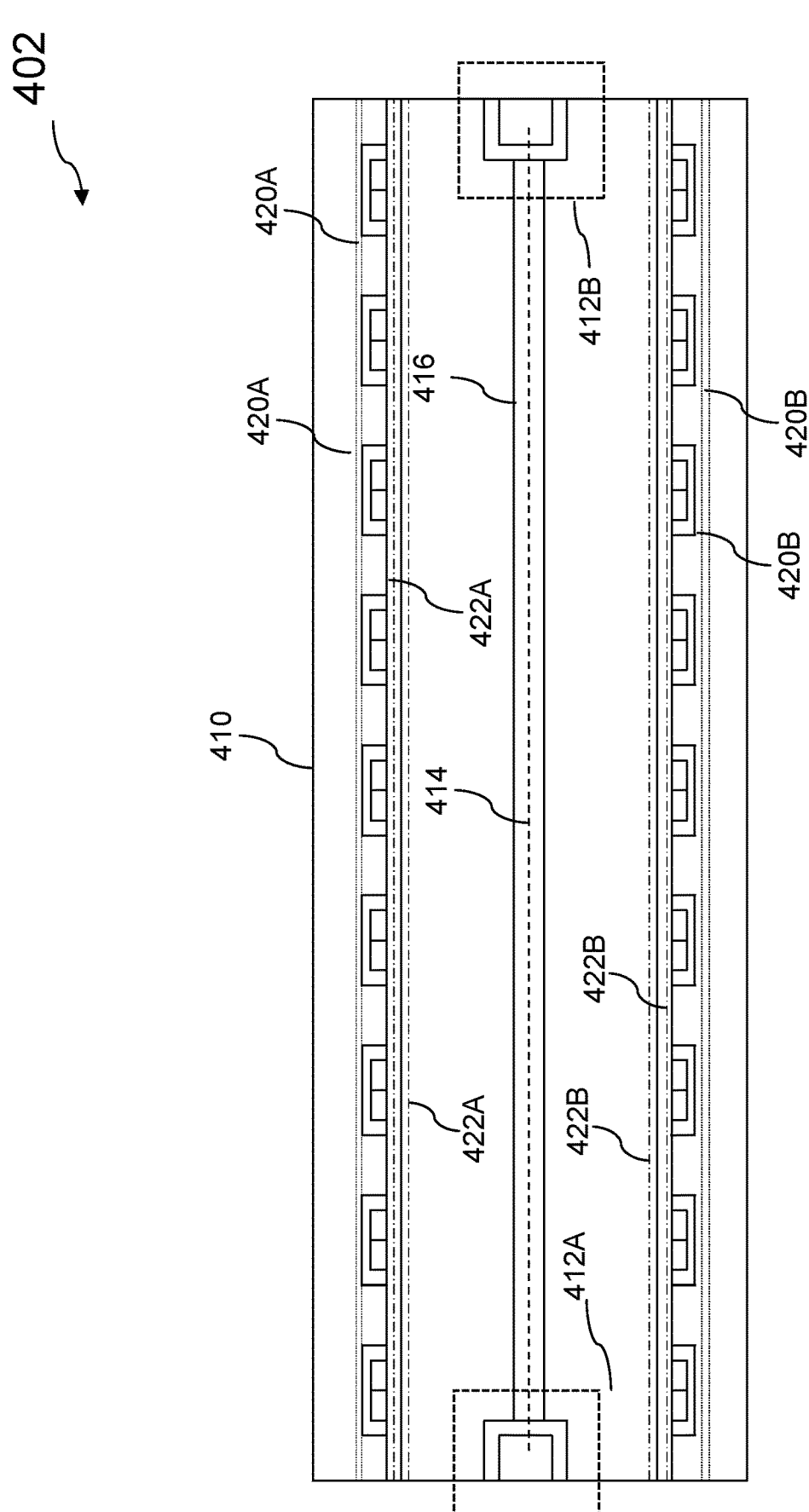
FIG. 4B is an annotated image depicting an M-connector in accordance with at least one embodiment of the present invention.
Figure 4C:
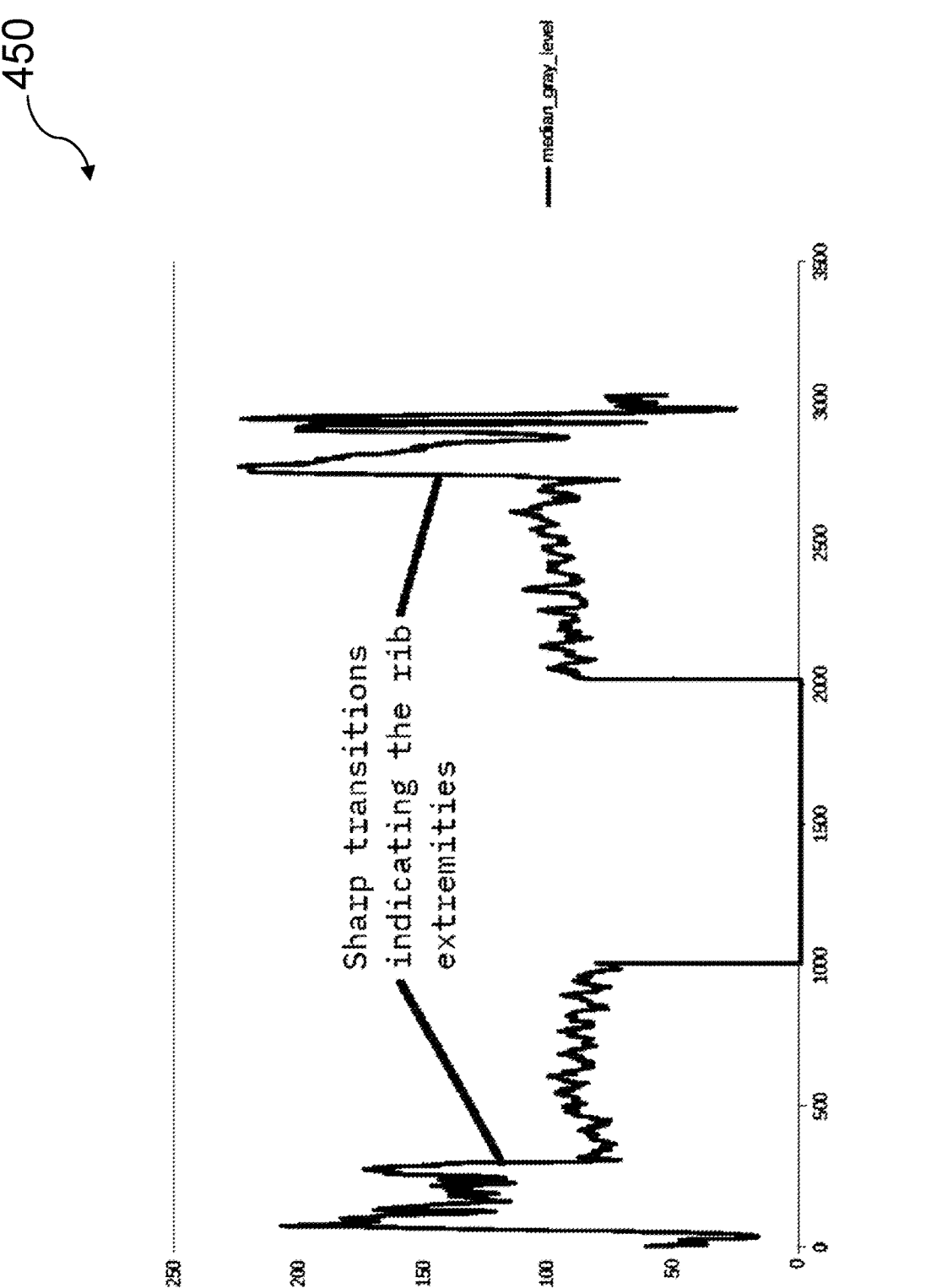
FIG. 4C is a graph depicting median gray levels corresponding to an image in accordance with at least one embodiment of the present invention.

Adding (340) reference lines to the image may include adding lines to the processed images indicating tolerance levels as indicated by the specification. With the pixel size known, the distance from the reference feature to one or more tolerance lines can be converted from millimeters to pixels; as such, the tolerance lines can be drawn on the rectified image at the appropriate scale with proper width and transparency. FIG. 4B depicts an annotated image 402 corresponding to image 400 of FIG. 4A. As depicted, image 402 is annotated to include upper tolerance lines 420A and 420B, lower tolerance lines 422A and 422B, and image datum 414.

Figure 4D:
FIG. 4D is a cropped image depicting an M-connector in accordance with at least one embodiment of the present invention.
Figure 4D:
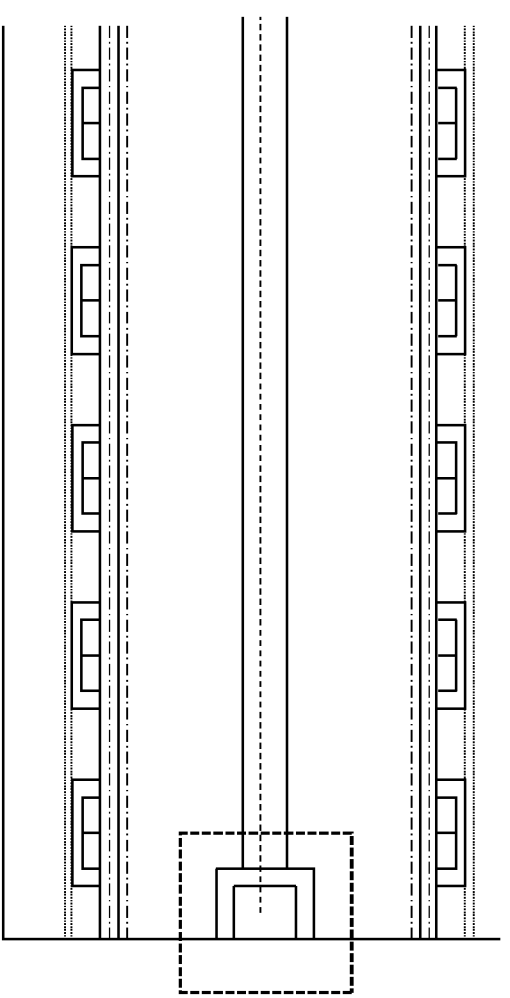
Figure 4E:
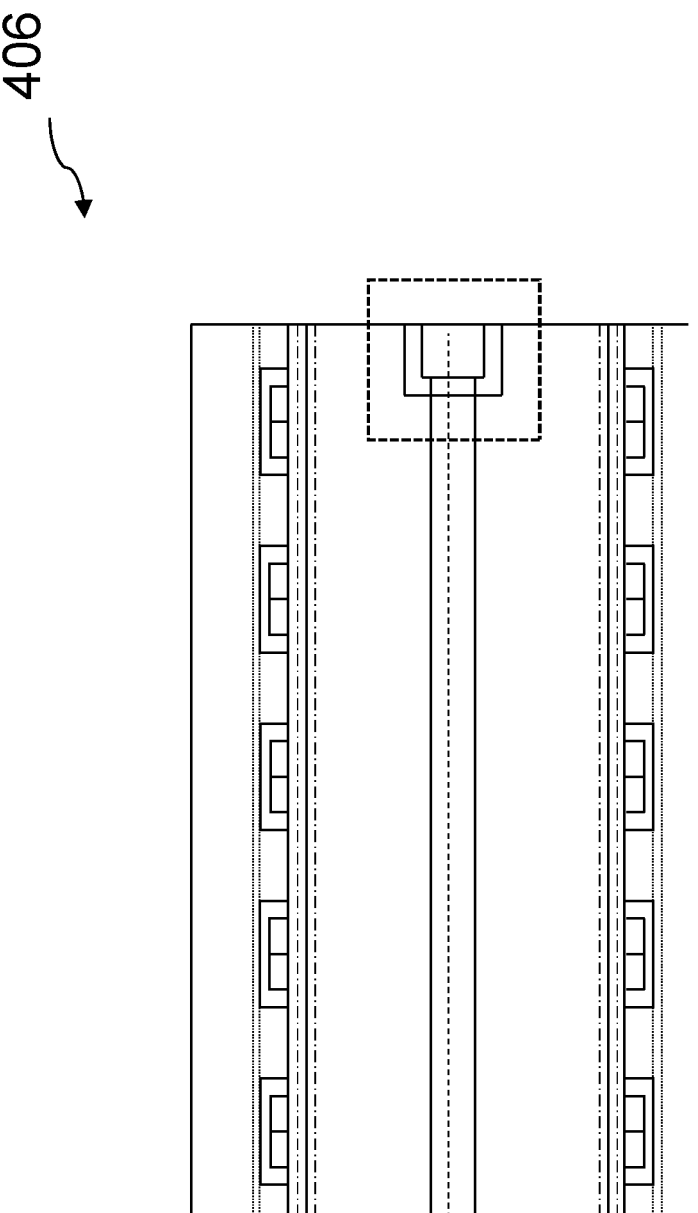
FIG. 4E is a cropped image depicting an M-connector in accordance with at least one embodiment of the present invention.

Cropping (350) one or more regions of interest may include cropping the image to include only image portions which include inspected features. When inspected features occupy only a small area of the image, the annotated image can be cropped to display only the regions pertinent to the inspected features. Cropping the image in such a manner can avoid sending an unnecessarily large image to a convolutional neural network in charge of identifying defects. FIG. 4D is an example of a left-cropped portion 404 of annotated image 402 of FIG. 4B; similarly, FIG. 4E is an example of a right-cropped portion 406 of annotated image 402 of FIG. 4B.

Figure 5:
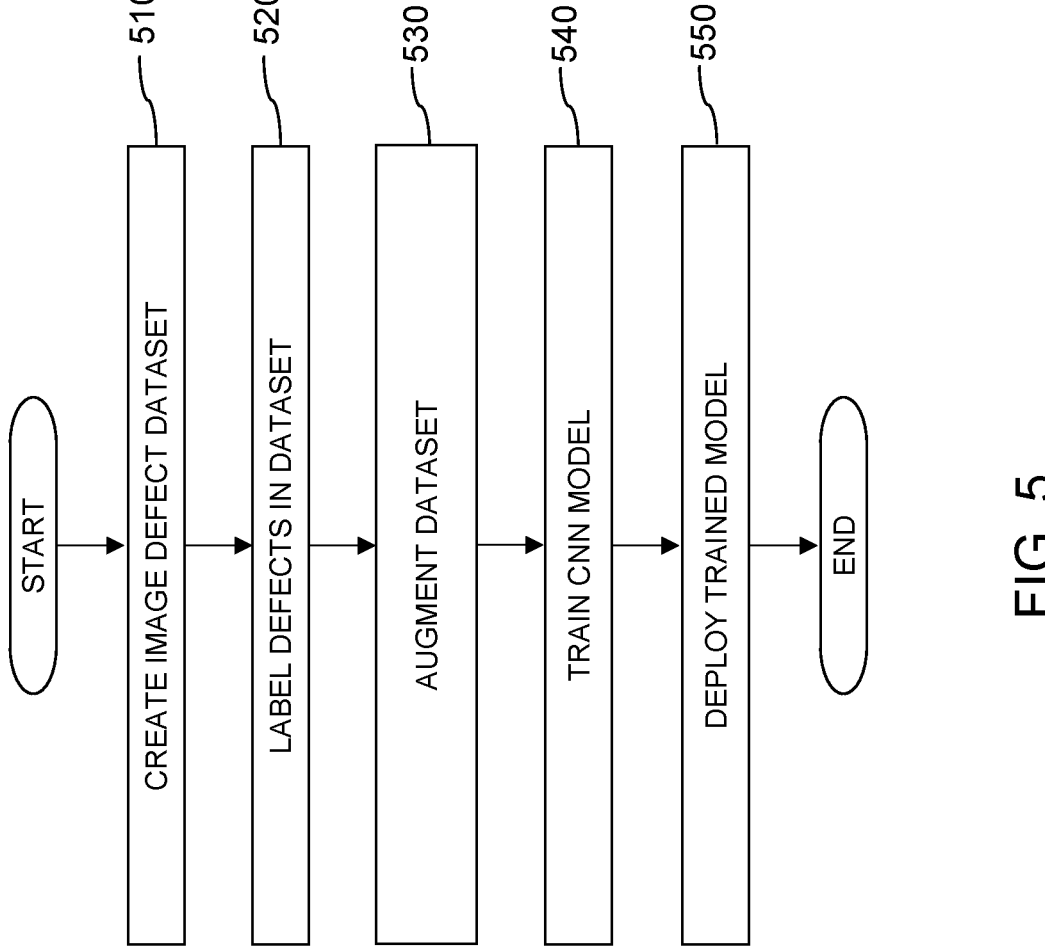
FIG. 5 is a flowchart depicting a convolutional neural network (CNN) deployment method in accordance with at least one embodiment of the present invention.
Figure 5:
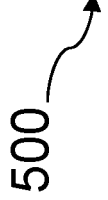

FIG. 5 is a flowchart depicting a convolutional neural network (CNN) deployment method 500 in accordance with at least one embodiment of the present invention. As depicted, CNN deployment method 500 includes creating (510) an image defect dataset, labeling (520) defects in the image defect dataset, augmenting (530) the image defect dataset, training (540) a convolutional neural network model, and deploying (550) the trained model. CNN deployment method 500 may enable increases in efficiency when analyzing very small tolerance sizes. CNN deployment method 500 may additionally enable out-of-specification detection for image features based off samples of features that fall out of the tolerance regions.

Creating (510) an image defect dataset may include selecting a group of processed images with a representative sample of different defects. In at least some embodiments, the defects are particular edges of any pin or pins in the connector which have crossed a tolerance line, moving outside the tolerances as defined relative to the specification. In general, creating (510) an image defect dataset includes establishing a set of images which display a representative sample of different defects.

Labeling (520) defects in the image defect dataset may include analyzing each image in the image defect dataset to identify the included image defects. Each defect in the dataset may be marked by a surrounding rectangle, for example, to provide a uniform indicator for the defects present across the many images. In at least some embodiments, each defect is labeled with a proper name, such as "data_pin_moving_up", or "ground_pin_moving_down", such that the defects are identifiable by their labels.

Augmenting (530) the image defect dataset may include processing the images already in the image defect dataset to provide altered versions of said images. In at least some embodiments, techniques such as vertical mirroring, horizontal mirroring, image blurring, image sharpening, and image degaussing may be used to create additional images of the known (and labeled) defects in the image defect dataset. In general, augmenting (530) the image defect dataset includes leveraging image manipulation techniques to create more images with representative defects, such that the image defect dataset includes a more robust representation of said defects.

Training (540) a convolutional neural network (CNN) model may include training a CNN model with the images from the augmented image defect dataset. In at least some embodiments, training (540) a convolutional neural network model includes using a sample of the images from the augmented image defect dataset to train the model and uses a separate sample for validation of the model to confirm proper operation. In at least some embodiments, training (540) a convolutional neural network model includes tracking the CNN model's performance based on the sample used for validation, and determining whether said performance meets a selected threshold indicating satisfactory performance.

Deploying (550) the trained model may include making the model available for use. In at least some embodiments, deploying (550) the trained model occurs responsive to determining that the model has met a satisfactory performance condition. Deploying (550) the trained model may include using the model to identify defects in images for which defect data is not currently available.

Figure 6:
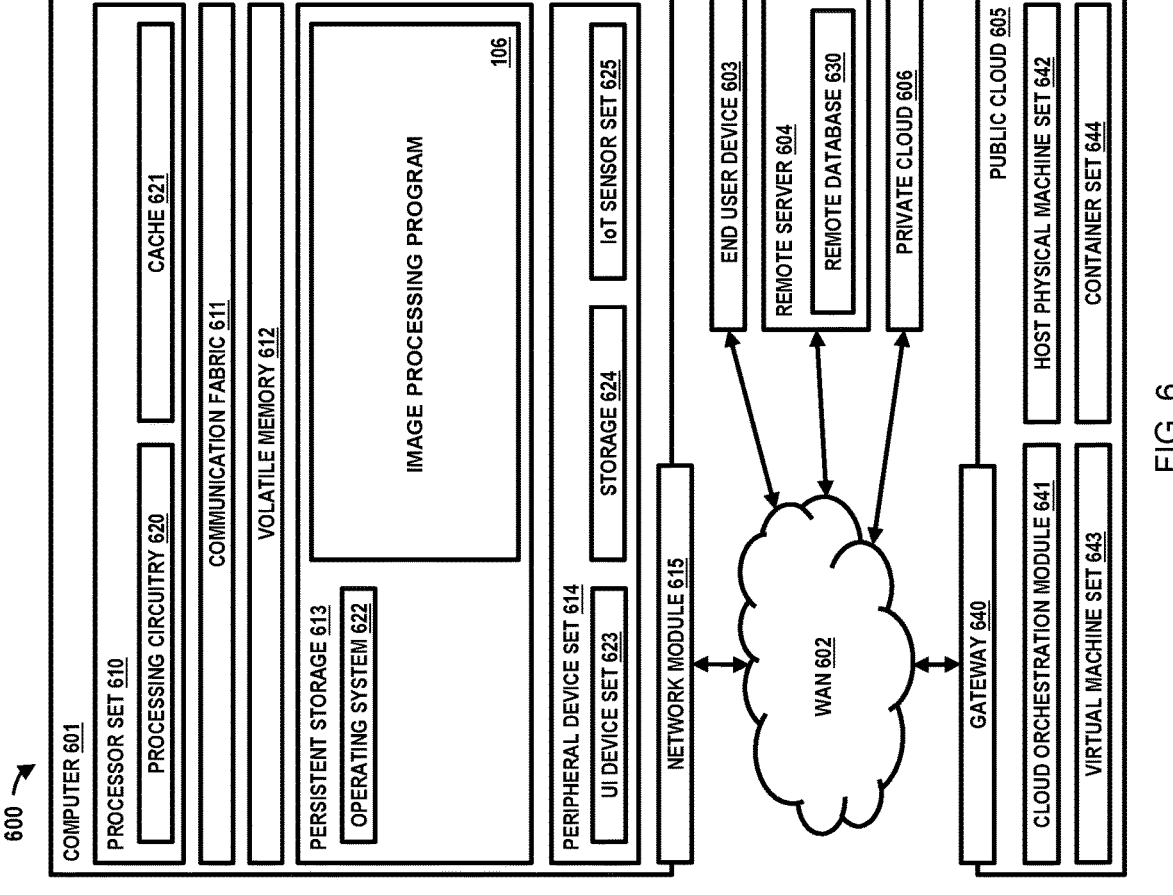
FIG. 6 illustrates an exemplary computer environment in which aspects of one or more of the illustrative embodiments may be implemented, and at least some of the computer code involved in performing the inventive methods may be executed, in accordance with an embodiment of the present invention.

FIG. 6 is an example diagram of a distributed data processing environment in which aspects of one or more of the illustrative embodiments may be implemented, and at least some of the computer code involved in performing the inventive methods may be executed, in accordance with an embodiment of the present invention, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Computing environment 600 contains an example of an environment for the execution of at least some of the computer code involved in performing the inventive methods, such as image processing program 106. In addition to image processing program 106, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and image processing program 106, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer

601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in image processing program 106 in persistent storage 613.

Communication fabric 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in image processing program 106 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601) and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving an image of an article of interest to be evaluated relative to one or more features of interest;
identifying a reference feature in the received image, wherein the reference feature is a feature of a known size;
identifying two or more extremities of the reference feature in the received image and a number of pixels between the two or more extremities of the reference feature;
calculating a pixel size for the image based on the reference feature size and the number of pixels between the two or more extremities of the reference feature;
annotating the received image to include one or more tolerance lines for the one or more features of interest according to the pixel size; and
determining whether the one or more features of interest in the image comply with the one or more tolerance lines.

2. The computer-implemented method of claim 1, further comprising computing a main axis of a predetermined reference feature of the article of interest.

3. The computer-implemented method of claim 2, further comprising rotating the image by an angle to align the main axis of the predetermined reference feature with any coordinate axis.

4. The computer-implemented method of claim 1, further comprising computing a running median over a vertical window of a predetermined dimension scanned along a length of the reference feature using the known size of the reference feature and respective coordinates of extremities of the predetermined reference feature.

5. The computer-implemented method of claim 1, wherein calculating a pixel size includes dividing the known size of the reference feature by a pixel distance between the extremities of the reference feature.

6. The computer-implemented method of claim 1, further comprising converting a distance from the reference feature to the one or more tolerance lines from millimeters to pixels to calculate upper and lower tolerance regions.

7. The computer-implemented method of claim 1, further comprising cropping the image to include only areas occupied by the one or more features of interest.

8. The computer-implemented method of claim 1, further comprising creating an image defect dataset by selecting a group of images with a representative sample of defects including edges of reference features which cross a tolerance line.

9. The computer-implemented method of claim 8, further comprising annotating the selected group of images by labeling one or more defects in each image of the selected group of images.

10. The computer-implemented method of claim 9, further comprising augmenting the image defect dataset by:
generating additional images from the selected group of images by altering the selected group of images; and
adding the generated additional images to the image defect dataset to provide an augmented image defect dataset.

11. The computer-implemented method of claim 10, further comprising training a convolutional neural network model using the augmented dataset.

12. The computer-implemented method of claim 11, further comprising:
determining a performance level of the convolutional neural network model using a sample of images from the augmented dataset; and
deploying the convolutional neural network model responsive to determining that the convolutional neural network model's performance meets a selected satisfactory threshold.

13. A computer program product comprising:
one or more computer readable storage media and program instructions collectively stored on the one or more computer readable storage media, the stored program instructions comprising program instructions to:
receive an image of an article of interest to be evaluated relative to one or more features of interest;
identify a reference feature in the received image, wherein the reference feature is a feature of a known size;
identify two or more extremities of the reference feature in the received image and a number of pixels between the two or more extremities of the reference feature;
calculate a pixel size for the image based on the reference feature size and the number of pixels between the two or more extremities of the reference feature;
annotate the received image to include one or more tolerance lines for the one or more features of interest according to the pixel size; and
determine whether the one or more features of interest in the image comply with the one or more tolerance lines.

14. The computer program product of claim 13, the program instructions further comprising instructions to:
create an image defect dataset by selecting a group of images with a representative sample of defects including edges of reference features which cross a tolerance line; and
annotate the selected group of images by labeling one or more defects in each image of the selected group of images.

15. The computer program product of claim 14, the program instructions further comprising instructions to augment the image defect dataset by:
generating additional images from the selected group of images by altering the selected group of images; and
adding the generated additional images to the image defect dataset to provide an augmented image defect dataset.

16. The computer program product of claim 15, the program instructions further comprising instructions to:
train a convolutional neural network model using the augmented dataset;
determine a performance level of the convolutional neural network model using a sample of images from the augmented dataset; and deploy the convolutional neural network model responsive to determining that the convolutional neural network model's performance meets a selected satisfactory threshold.

17. A computer system comprising:

one or more computer processors;

one or more computer readable storage media;

program instructions collectively stored on the one or more computer readable storage media for execution by at least one of the one or more computer processors, the stored program instructions comprising program instructions to:

receive an image of an article of interest to be evaluated relative to one or more features of interest;

identify a reference feature in the received image, wherein the reference feature is a feature of a known size;

identify two or more extremities of the reference feature in the received image and a number of pixels between the two or more extremities of the reference feature;

calculate a pixel size for the image based on the reference feature size and the number of pixels between the two or more extremities of the reference feature;

annotate the received image to include one or more tolerance lines for the one or more features of interest according to the pixel size; and determine whether the one or more features of interest in the image comply with the one or more tolerance lines.

18. The computer system of claim 17, the program instructions further comprising instructions to:

create an image defect dataset by selecting a group of images with a representative sample of defects including edges of reference features which cross a tolerance line; and annotate the selected group of images by labeling one or more defects in each image of the selected group of images.

19. The computer system of claim 18, the program instructions further comprising instructions to augment the image defect dataset by:

generating additional images from the selected group of images by altering the selected group of images; and adding the generated additional images to the image defect dataset to provide an augmented image defect dataset.

20. The computer system of claim 19, the program instructions further comprising instructions to:

train a convolutional neural network model using the augmented dataset;

determine a performance level of the convolutional neural network model using a sample of images from the augmented dataset; and deploy the convolutional neural network model responsive to determining that the convolutional neural network model's performance meets a selected satisfactory threshold.

* * * * *